(12) United States Patent
Morinaga et al.

(10) Patent No.: US 10,835,805 B2
(45) Date of Patent: Nov. 17, 2020

(54) SLIDING INSTRUMENT AND METHOD FOR MANUFACTURING SAME

(71) Applicant: FUJIMI INCORPORATED, Kiyosu (JP)

(72) Inventors: Hitoshi Morinaga, Aichi (JP); Hiroyuki Ishida, Aichi (JP); Naoto Miyamoto, Miyagi (JP)

(73) Assignee: FUJIMI INCORPORATED, Kiyosu (JP)

(*) Notice: Subject to any disclaimer, the term of this patent is extended or adjusted under 35 U.S.C. 154(b) by 0 days.

(21) Appl. No.: 16/308,404

(22) PCT Filed: Jun. 2, 2017

(86) PCT No.: PCT/JP2017/020669
§ 371 (c)(1),
(2) Date: Dec. 7, 2018

(87) PCT Pub. No.: WO2017/213051
PCT Pub. Date: Dec. 14, 2017

(65) Prior Publication Data
US 2019/0126130 A1    May 2, 2019

(30) Foreign Application Priority Data
Jun. 10, 2016  (JP) .................... 2016-116395

(51) Int. Cl.
*A63C 5/12*    (2006.01)
*A63C 5/044*   (2006.01)
(Continued)

(52) U.S. Cl.
CPC .............. *A63C 5/12* (2013.01); *A63C 1/30* (2013.01); *A63C 1/42* (2013.01); *A63C 5/04* (2013.01);
(Continued)

(58) Field of Classification Search
CPC .... A63C 5/04; A63C 7/00; A63C 7/02; A63C 7/04
See application file for complete search history.

(56) References Cited

U.S. PATENT DOCUMENTS 4,705,815 A * 11/1987 Longeray .............. A63C 5/056
                                                          280/604
5,328,200 A    7/1994 Pelizzari
(Continued)

FOREIGN PATENT DOCUMENTS

CN    102089044 A    6/2011
CN    103550925 A    2/2014
(Continued)

OTHER PUBLICATIONS

Supplementary European Search Report issued in corresponding European Patent Application No. 178102229, dated May 29, 2019.
(Continued)

*Primary Examiner* — John D Walters
*Assistant Examiner* — James J Triggs
(74) *Attorney, Agent, or Firm* — Foley & Lardner LLP

(57) ABSTRACT

Provided are a sliding instrument having a low frictional resistance to the snow surface, the ice surface, or the water surface and having excellent sliding performance and a method for manufacturing the sliding instrument. A sliding instrument to slide on snow, ice, or water includes a sliding surface (1) to come into contact with the snow surface, the ice surface, or the water surface, and the sliding surface (1) has a surface roughness Ra of 1.0 μm or less. A method for manufacturing the sliding instrument includes polishing a sliding surface (1) using a polishing composition slurry containing abrasives to make the sliding surface (1) have a surface roughness Ra of 1.0 μm or less.

13 Claims, 1 Drawing Sheet

(51) Int. Cl.
    A63C 11/08    (2006.01)
    C09G 3/00     (2006.01)
    B63B 32/20    (2020.01)
    A63C 1/30     (2006.01)
    A63C 1/42     (2006.01)
    A63C 5/04     (2006.01)

(52) U.S. Cl.
    CPC .............. *A63C 5/044* (2013.01); *A63C 11/08* (2013.01); *B63B 32/20* (2020.02); *C09G 3/00* (2013.01)

(56) References Cited

U.S. PATENT DOCUMENTS

| | | | | |
|---|---|---|---|---|
| 5,516,556 A | * | 5/1996 | Baker | A63C 1/30 280/11.18 |
| 5,549,743 A | * | 8/1996 | Pearce | A43B 5/0405 106/122 |
| 5,725,237 A | * | 3/1998 | Krafft | A63C 5/044 280/609 |
| 5,825,237 A | | 10/1998 | Ogawa | |
| 6,284,715 B1 | | 9/2001 | Gambaretto | |
| 7,891,694 B2 | * | 2/2011 | Schamesberger | A63C 5/0428 280/601 |
| 9,266,009 B2 | * | 2/2016 | Histed | A63C 5/044 |
| 2011/0104436 A1 | | 5/2011 | Histed | |
| 2016/0001152 A1 | | 1/2016 | Schnetter | |

FOREIGN PATENT DOCUMENTS

| | | |
|---|---|---|
| DE | 10 2013 013 678 A | 8/2014 |
| EP | 1 029 905 A1 | 8/2000 |
| EP | 2 300 112 A1 | 3/2011 |
| JP | H01-198575 A | 8/1989 |
| JP | H07-194760 A | 8/1995 |
| JP | 2000-239615 A | 9/2000 |
| JP | 2003-299762 A | 10/2003 |
| JP | 2009-249624 A | 10/2009 |
| JP | 2011-519650 A | 7/2011 |
| JP | 2016-513990 A | 5/2016 |

OTHER PUBLICATIONS

International Search Report, PCT/JP2017/020669 (dated Aug. 29, 2017).

* cited by examiner

SLIDING INSTRUMENT AND METHOD FOR MANUFACTURING SAME

CROSS-REFERENCE TO RELATED APPLICATIONS

This application is a U.S. National Stage Application of PCT/JP2017/020669, filed Jun. 2, 2017, which claims the benefit of and priority to Japanese Patent Application No. 2016-116395, filed Jun. 10, 2016, the entire contents of which are incorporated herein by reference.

TECHNICAL FIELD

The present invention relates to a sliding instrument and a method for manufacturing the sliding instrument.

BACKGROUND ART

Sliding instruments for sliding on snow, ice, or water (for example, snow skis for sliding on snow, ice skates for sliding on ice, water skis for sliding on water) have smooth water repellent sliding surfaces for reducing frictional resistance to the snow surface, the ice surface, or the water surface to improve sliding performance. For example, for snow skis, sliding surfaces are subjected to smoothing treatment and water repellent treatment by grinding with fixed abrasives and by application of wax to form a wax coating.

Conventional snow skis have smooth water repellent sliding surfaces, but still has room for improvement in sliding performance.

CITATION LIST

Patent Literatures

PTL 1: JP 7-194760 A
PTL 2: JP 2003-299762 A

SUMMARY OF INVENTION

Technical Problem

In such circumstances, the present invention is intended to solve the above problem in the related art and to provide a sliding instrument having a low frictional resistance to the snow surface, the ice surface, or the water surface and having excellent sliding performance and a method for manufacturing the sliding instrument.

Solution to Problem

To solve the problem, a sliding instrument pertaining to an aspect of the present invention is to slide on snow, ice, or water and includes a sliding surface to come into contact with a snow surface, an ice surface, or a water surface, and the sliding surface has a surface roughness Ra of 1.0 µm or less.

A method for manufacturing a sliding instrument pertaining to another aspect of the present invention is a method for manufacturing a sliding instrument to slide on snow, ice, or water, and the method includes polishing a sliding surface to come into contact with a snow surface, an ice surface, or a water surface, with a polishing composition slurry containing abrasives to make the sliding surface have a surface roughness Ra of 1.0 µm or less.

Advantageous Effects of Invention

A sliding instrument pertaining to the present invention has a low frictional resistance to the snow surface, the ice surface, or the water surface and has excellent sliding performance. A method for manufacturing a sliding instrument pertaining to the present invention enables production of a sliding instrument having a low frictional resistance to the snow surface, the ice surface, or the water surface and having excellent sliding performance.

DESCRIPTION OF EMBODIMENTS

Embodiments of the present invention will be described in detail. The following embodiments are merely examples of the present invention, and the invention is not limited to the embodiments. Various modifications or improvements can be added to the following embodiments, and the invention can also include such variously modified or improved forms.

Figure 1:
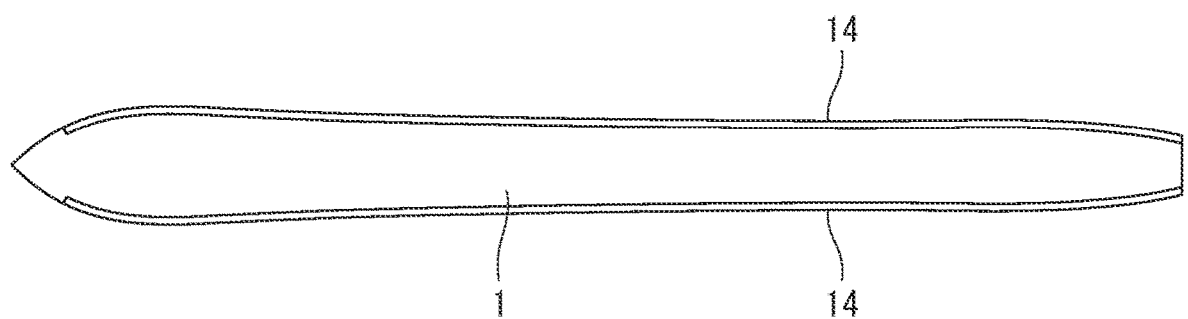
FIG. 1 is a bottom view of a snow ski as an embodiment of a sliding instrument pertaining to the present invention.
Figure 2:
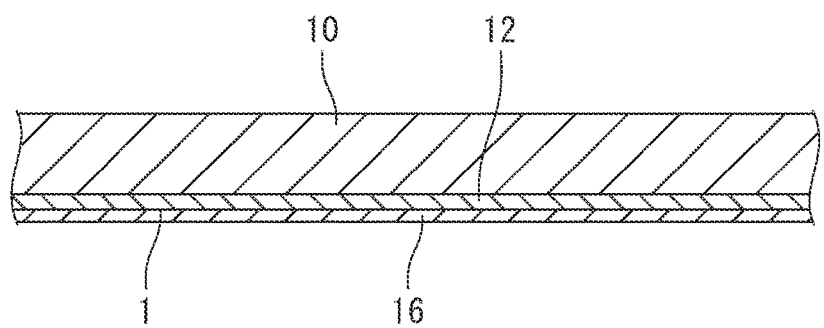
FIG. 2 is a sectional view taken along a plane orthogonal to the longitudinal direction of the snow ski in FIG. 1.

A snow ski as an embodiment of the sliding instrument pertaining to the present invention is a sliding instrument for sliding on snow. The snow ski of the embodiment, as illustrated in FIGS. 1 and 2, includes a long, substantially plate-like core material 10, a sole 12 provided on the bottom face of the core material 10, and edges 14, 14 provided on the respective sides of the sole 12 in the width direction. The core material 10 includes wood or a fiber-reinforced resin, for example. The sole 12 includes a resin such as polyethylene (for example, a high molecular weight, high density polyethylene), polypropylene, polybutene, polyacetal, polymethacrylate, and polytetrafluoroethylene. The edge 14 includes a metal, for example.

An exposed surface of the sole 12 is the bottom face of the snow ski, and the bottom face is a sliding surface 1 to come into contact with the snow surface at the time of sliding. The sliding surface 1 is smoothly polished in order to achieve smoothness and water repellency, and has a surface roughness Ra of 1.0 µm or less (preferably 0.5 µm or less, more preferably 0.25 µm or less, even more preferably 0.1 µm or less). The surface roughness Ra of the sliding surface 1 can be determined by a prove or laser measuring instrument.

The sliding surface of a conventional snow ski typically has a surface roughness Ra of 1.5 µm or more, and thus the sliding surface 1 of the snow ski in the embodiment has outstanding smoothness and water repellency as compared with conventional snow skis. This markedly reduces the frictional resistance between the sliding surface 1 and the snow surface at the time of sliding, and thus the snow ski in the embodiment has outstanding sliding performance.

The method of polishing the sliding surface 1 may be any polishing method capable of giving a surface roughness Ra of 1.0 µm or less (preferably 0.5 µm or less, more preferably 0.25 µm or less, even more preferably 0.1 µm or less), and is preferably a polishing method using a polishing composition slurry containing abrasives. For example, the polishing composition slurry is interposed between a polishing pad and the sliding surface 1, then the polishing pad and the sliding surface 1 are relatively moved to cause friction while the polishing pad is pressed against the sliding surface 1, and thus the sliding surface 1 can be polished. In place of the polishing composition slurry, a polishing composition compound containing abrasives may be used to polish the sliding surface 1 as long as the sliding surface can have a surface roughness Ra of 1.0 μm or less.

The sliding surface of a conventional snow ski is polished by a polishing instrument containing fixed abrasives (for example, a grindstone or a file), and thus has a surface roughness Ra of about 2.5 μm. In a known method for further improving the smoothness of a sliding surface, a solid wax such as paraffin wax is applied, and then a scraper, a brush, or a similar tool is used to adjust the surface roughness Ra to about 1.5 to 2.0 μm, but polishing methods of further smoothing the sliding surface of a snow ski have been impracticable. However, a polishing method using such a polishing composition slurry as above allows the sliding surface 1 to have a surface roughness Ra of 1.0 μm or less.

A snow ski having a sliding surface with a surface roughness Ra of 1.0 μm or less has not been thought to have a significantly lower frictional resistance between the sliding surface and the snow surface at the time of sliding than a snow ski having a sliding surface with a surface roughness Ra of about 1.5 μm. The inventors of the present invention have found that a snow ski having a sliding surface 1 with a surface roughness Ra of 1.0 μm or less has a significantly lower frictional resistance between the sliding surface 1 and the snow surface at the time of sliding than conventional skis.

In the embodiment, the present invention has been described by using a snow ski as an example of the sliding instrument, but the snow ski may be any type. For example, the snow ski may be snow skis for Nordic skiing competitions or snow skis for Alpine skiing competitions. The snow skis for Nordic skiing competitions include snow skis for jumping competitions and snow skis for long-distance competitions.

The sliding instrument pertaining to the present invention is not limited to snow skis. Examples of the sliding instruments for sliding on snow except snow skis include snow boards, chair skis, sleds, and snowmobiles. A snowmobile includes sled-like parts as steering parts in place of wheels, and thus the present invention is applicable to the sled-like parts.

The snow surface on which the sliding instrument pertaining to the present invention slides may have any snow quality, and the sliding instrument can slide on the surface of fresh snow, fastened snow, granular snow, and artificial snow, for example.

The snow surface on which the sliding instrument pertaining to the present invention slides may have any snow temperature, and the sliding instrument pertaining to the present invention can be preferably used on the snow surface at a snow temperature of 0° C. or less, for example.

The sliding instrument pertaining to the present invention may be used at any ambient temperature, and the sliding instrument pertaining to the present invention can be preferably used at an ambient temperature of 3° C. or less, for example.

The snow surface on which the sliding instrument pertaining to the present invention slides may have any humidity.

The present invention can be applied not only to sliding instruments for sliding on snow but also to sliding instruments for sliding on ice or water. For sliding instruments for sliding on ice or water, a sliding surface having a surface roughness Ra of 1.0 μm or less (preferably 0.5 μm or less, more preferably 0.25 μm or less, even more preferably 0.1 μm or less) can achieve the above effect as with the sliding instruments for sliding on snow.

Examples of the sliding instrument for sliding on ice include ice skates, sleds, and curling stones. For example, when the sliding instrument is an ice skate, the sliding surface of a metal blade to come into contact with the ice surface can have a surface roughness Ra of 1.0 μm or less (preferably 0.5 μm or less, more preferably 0.25 μm or less, even more preferably 0.1 μm or less).

The ice skate may be any type and include ice hockey skates, ice skates for speed skating, and ice skates for figure skating, for example. The sled may be any type and include sleds for bobsledding, sleds for luge, and sleds for skeleton, for example.

Examples of the sliding instrument for sliding on water include water skis, surfboards, boats, rafts, and airboats. For example, when the sliding instrument is a boat, the outer surface of the bottom of the boat comes into contact with the water surface as the sliding surface, and thus the outer surface of the bottom of the boat can have a surface roughness Ra of 1.0 μm or less (preferably 0.5 μm or less, more preferably 0.25 μm or less, even more preferably 0.1 μm or less). The boat may be any type and include yachts, canoes, passenger boats, cargo boats, and hydrofoil boats, for example.

The airboat may be any type and, for example, include flying boats designed to have a boat type airframe structure capable of floating and sliding on the water surface and to enable takeoff and landing on water and float planes designed to have a float-like rig and to enable takeoff and landing on water. For example, when the sliding instrument is a flying boat, the outer surface of the bottom of the flying boat comes into contact with the water surface as the sliding surface, and thus the outer surface of the bottom of the flying boat can have a surface roughness Ra of 1.0 μm or less (preferably 0.5 μm or less, more preferably 0.25 μm or less, even more preferably 0.1 μm or less). For example, when the sliding instrument is a float plane, the outer surface of the bottom of the float comes into contact with the water surface as the sliding surface, and thus the outer surface of the bottom of the float can have a surface roughness Ra of 1.0 μm or less (preferably 0.5 μm or less, more preferably 0.25 μm or less, even more preferably 0.1 μm or less).

As described above, a sliding surface 1 having a surface roughness Ra of 1.0 μm or less markedly reduces the frictional resistance between the sliding surface 1 and the snow surface at the time of sliding, and thus such a snow ski obtains outstanding sliding performance. When the sliding surface 1 having a surface roughness Ra of 1.0 μm or less is coated with a lubricant coating 16 (see FIG. 2), the sliding surface 1 obtains much higher water repellency to further reduce the frictional resistance between the sliding surface 1 and the snow surface at the time of sliding, and accordingly such a snow ski has much higher sliding performance.

To coat a sliding surface 1 with a lubricant coating 16, a polishing step of polishing the sliding surface 1 with a polishing composition slurry containing abrasives to make the sliding surface 1 have a surface roughness Ra of 1.0 μm or less (preferably 0.5 μm or less, more preferably 0.25 μm or less, even more preferably 0.1 μm or less) can be followed by an applying step of applying a lubricant coating 16 onto the polished sliding surface 1. Needless to say, the lubricant coating 16 also preferably has a smooth surface. To smooth the surface of the coating 16, the surface of the coating 16 can be polished to have a surface roughness Ra of 1.0 μm or less (preferably 0.5 μm or less, more preferably 0.25 μm or less, even more preferably 0.1 μm or less). The lubricant coating 16 may have any thickness. When a sliding surface 1 after polishing has a surface roughness Ra of more than 1.0 μm, but the surface of the coating 16 has a surface roughness Ra of 1.0 μm or less (preferably 0.5 μm or less, more preferably 0.25 μm or less, even more preferably 0.1 μm or less), a similar effect to the above may be exerted.

The method of applying the lubricant coating 16 onto the sliding surface 1 may be any method, and a common method including roll coating, spraying, and brush coating can be used without any problem. The lubricant may be any type, and a common lubricant including petroleum lubricants (for example, paraffin hot wax), mineral lubricants, and fluorine lubricants can be used. The lubricant may have any properties, and solid, grease, and liquid lubricants can be used, for example.

The polishing composition slurry usable for polishing the sliding surface 1 will next be described. The polishing composition slurry contains abrasives and a liquid medium, and the abrasives disperse in the liquid medium to form a slurry. The polishing composition slurry may contain additives as needed.

The abrasives may be any type and include abrasives of aluminum oxide, silicon dioxide, cerium oxide, zirconium oxide, zircon, titanium oxide, manganese oxide, silicon carbide, boron carbide, titanium carbide, titanium nitride, silicon nitride, titanium boride, and tungsten boride, for example.

The abrasives preferably have an average secondary particle diameter of 15 μm or less, more preferably 5 μm or less, even more preferably 3 μm or less, particularly preferably 1 μm or less, further preferably 0.5 μm or less, and most preferably 0.3 μm or less. Abrasives having a smaller average secondary particle diameter are less likely to form scratches on the sliding surface 1 after polishing to give an excellent surface roughness Ra and are likely to give higher smoothness. The average secondary particle diameter of abrasives can be determined by dynamic light scattering, laser diffractometry, laser scattering, or a pore electrical resistance method, for example.

The polishing composition slurry preferably has an abrasive concentration of 45% by mass or less and more preferably 25% by mass or less. A lower abrasive concentration can provide high dispersivity and reduce the cost. The polishing composition slurry preferably has an abrasive concentration of 2% by mass or more and more preferably 10% by mass or more. A higher abrasive concentration provides a higher polishing removal rate.

The additive may be any type, and additives including a pH adjuster, an etching agent, an oxidant, a water-soluble polymer, an anticorrosive, a chelating agent, a dispersion assistant, an antiseptic agent, and an antifungal agent may be added to the polishing composition slurry as needed. Additives may be used singly or in combination of two or more of them.

The liquid medium is a dispersion medium or a solvent for dispersing or dissolving components including abrasives and additives. The liquid medium may be any type and include water and organic solvents (such as oils and fats, alcohols, ethers), for example. Liquid media may be used singly or in combination of two or more of them, and water is preferably contained.

The polishing composition compound is substantially the same as the polishing composition slurry except that the compound has a lower liquid medium concentration than the polishing composition slurry and is in a semisolid form (grease form), and the same types of abrasives, liquid medium, and additives as in the polishing composition slurry are used. The explanation is thus omitted.

A polishing pad usable for polishing the sliding surface 1 will next be described. The polishing pad may be made from any material, and examples of the material include fabric, nonwoven fabric, suede, polyurethane foams, polyethylene foams, and porous fluorine resins. Either a polishing pad containing abrasives or a polishing pad free of abrasives may be used. The polishing face of the polishing pad may have grooves for holding a polishing composition slurry. A flocked fabric containing wool, nylon, or other fibers and a woven fabric (examples of the flocked fabric and the woven fabric include carpet) can also be used as the polishing pad. In place of the polishing pad, a brush using fibers such as nylon fibers or a sponge using a resin such as a urethane resin, a phenol resin, and an epoxy resin may be used to polish the sliding surface 1.

The sliding surface 1 may be polished with a polishing machine having such a function as to support and move a polishing pad for polishing. Alternatively, a polishing technician may manually move a hand polisher with a polishing pad, or a polishing technician gripping a polishing pad may manually move the polishing pad. Alternatively, the sliding surface 1 may be fixed, and a hand polisher with a polishing pad may be moved by a robot arm or the like to polish the sliding surface 1.

EXAMPLES

The present invention will be described more specifically with reference to examples and comparative examples. A side face of a substantially quadrangular prism polyethylene test piece (a wax test tool, Nordic Torpedo from Central Cross Country Ski Association (CXC); dimensions, 43 mm×43 mm×300 mm; mass, 489 g) was polished to an intended surface roughness Ra. The test pieces in Example 1 and Example 2 were subjected to mirror polishing with a polishing composition slurry and a polishing pad. Each polished face of the test pieces in Example 1 and Example 2 had a surface roughness Ra of 0.04 μm.

The test pieces in Example 3 and Example 4 were subjected to rough polishing with a polishing composition slurry and a polishing pad. Each polished face of the test pieces in Example 3 and Example 4 had a surface roughness Ra of 0.41 μm.

The test pieces in Comparative Example 1 and Comparative Example 2 were polished with a polishing composition slurry and a polishing pad. Each polished face of the test pieces in Comparative Example 1 and Comparative Example 2 had a surface roughness Ra of 1.68 μm. The test pieces in Comparative Example 3 and Comparative Example 4 were subjected to rough polishing with a sandpaper (WA #320). One side face of each test piece in Comparative Example 3 and Comparative Example 4 had a surface roughness Ra of 2.31 μm.

The surface roughness Ra of each test piece was determined with a laser microscope, 3D Laser Scanning Microscope VK-X200 manufactured by Keyence Corporation. The magnification was 1,000-fold, and the measurement area had dimensions of 284 μm×213 μm.

The polishing composition slurry used for polishing the test pieces in Example 1 and Example 2 contained 20% by mass of silica having an average secondary particle diameter of 80 nm and 80% by mass of pure water (pH=10). The polishing pad used for polishing the test pieces in Example 1 and Example 2 was made from suede. The polishing composition slurry used for polishing the test pieces in Example 3 and Example 4 contained 18% by mass of alumina having an average secondary particle diameter of 3.0 μm and 82% by mass of pure water (pH=3). The polishing pad used for polishing the test pieces in Example 3 and Example 4 was made from nonwoven fabric. The polishing composition slurry used for polishing the test pieces in Comparative Example 1 and Comparative Example 2 contained 20% by mass of alumina having an average secondary particle diameter of 59.0 μm and 80% by mass of pure water (pH=6). The polishing pad used for polishing the test pieces in Comparative Example 1 and Comparative Example 2 was made from nonwoven fabric. Polishing conditions for the test pieces in Examples 1 to 4 and Comparative Examples 1 and 2 are illustrated below.

Polishing machine: a polishing machine manufactured by Lapmaster, model 36PL-3R
Polishing pressure: 19.6 kPa (200 gf/cm$^2$)
Rotation rate of platen: 30 min$^{-1}$
Polishing time: 20 minutes
Supply flow rate of polishing composition: 50 mL/min To each polished face of the test pieces in Examples 2 and 4 and Comparative Examples 2 and 4, a lubricant was applied to form a lubricant coating. The lubricant used was a liquid fluorine wax, Dr. FCG MaxFluor manufactured by Gallium Co., Ltd. The surface roughness Ra after application of the lubricant (the surface roughness Ra of the lubricant coating) was the same as that before application (the surface roughness Ra of the polished face). On each polished face of the test pieces in Examples 1 and 3 and Comparative Examples 1 and 3, no lubricant coating was formed.

The Sliding performance of each test piece in Examples 1 to 4 and Comparative Examples 1 to 4 prepared as above was evaluated at the time of sliding on snow. For each test piece in Examples 1 and 3 and Comparative Examples 1 and 3, the polished face was the sliding surface to come into contact with the snow surface. For each test piece in Examples 2 and 4 and Comparative Examples 2 and 4, the polished face coated with the lubricant coating was the sliding surface to come into contact with the snow surface.

A test piece was placed on an inclined snow surface while the sliding surface faced downward, and the sliding performance of the test piece sliding downward along the snow surface was evaluated. The inclined snow surface was a slope having a height difference of 80 cm and a length of 15 m. The inclination angle was large in the upper region (up to 10°) and small in the lower region (about 0°).

Sliding performance was evaluated in the following two conditions. In condition 1, the ambient temperature was −2° C., the humidity was 70%, the snow temperature was −4 to −2° C., and the snow quality was fastened snow (a crystal grain diameter of 5 mm). In condition 2, the ambient temperature was 10° C., the humidity was 55%, the snow temperature was −2° C., and the snow quality was fastened snow. The snow in the condition 2 had a higher water content than that in the condition 1, and thus such a snow quality had a disadvantage in sliding as compared with the condition 1.

First, the evaluation method of sliding performance in the condition 1 will be described in detail. In the condition 1, the snow quality had an advantage in sliding, and thus the sliding speed (unit: m/s) and the kinetic friction coefficient of a test piece sliding downward along the snow surface were determined sequentially. A test piece had a GPS sensor, thus positional information of the sliding test piece was collected by the GPS sensor every 200 milliseconds, and changes in positional information were used to calculate the sliding speed and the kinetic friction coefficient of the test piece.

On x, y coordinates where the x-axis represents sliding speed and the y-axis represents kinetic friction coefficient, the measured values of sliding speed and kinetic friction coefficient were plotted, then the approximate line was determined, and the slope of the approximate line Δμ/Δv was calculated. The maximum speed of the test piece was also determined. The sliding test was performed six times for a single test piece, then all the data of the six sliding tests were used to determine the slope Δμ/Δv and the maximum speed, and the sliding performance of the test piece was evaluated on the basis of these values.

Next, the evaluation method of sliding performance in the condition 2 will be described in detail. In the condition 2, the snow quality had a disadvantage in sliding, and thus a test piece did not slide a long distance unlike the condition 1. Hence, a test piece was placed on an inclined snow surface, and a sliding distance from the start to end of sliding was determined to evaluate sliding performance.

TABLE 1

| | Surface roughness Ra (μm) | Lubricant coating | Condition 1 Δμ/Δv | Maximum speed (m/s) | Condition 2 Sliding distance |
|---|---|---|---|---|---|
| Example 1 | 0.04 | Without | 0.0412 | 2.28 | 1 m |
| Example 2 | 0.04 | With | 0.0264 | 2.44 | 1 m and over |
| Example 3 | 0.41 | Without | 0.0652 | 2.03 | Several centimeters |
| Example 4 | 0.41 | With | 0.0447 | 2.23 | Several centimeters |
| Comp. Ex. 1 | 1.68 | Without | 0.0546 | 2.23 | No sliding |
| Comp. Ex. 2 | 1.68 | With | 0.0333 | 2.41 | No sliding |
| Comp. Ex. 3 | 2.31 | Without | 0.0783 | 1.92 | No sliding |
| Comp. Ex. 4 | 2.31 | With | 0.0515 | 2.09 | No sliding |

The results are listed in Table 1. As apparent from the results in the condition 2, Examples 1 to 4 in which the sliding surfaces had a surface roughness Ra of 1.0 μm or less had excellent sliding distances as compared with Comparative Examples 1 and 2 in which the sliding surfaces had a surface roughness Ra of 1.68 μm and Comparative Examples 3 and 4 in which the sliding surfaces had a surface roughness Ra of 2.31 μm. In particular, Examples 1 and 2 in which the sliding surfaces had a surface roughness Ra of 0.04 μm had outstanding sliding distances. These results reveal that Examples 1 to 4 achieve excellent sliding performance.

As apparent from the results in the condition 1, the sliding surfaces coated with a lubricant coating had higher maximum speeds than those of sliding surfaces with no lubricant coating, and the results from Examples 1 and 2 also indicate that the coating is likely to give a longer sliding distance.

Next, Examples 5 to 7 and Comparative Examples 5 and 6, in which sliding performance was evaluated in different conditions from Examples 1 to 4 and Comparative Examples 1 to 4, will be described. In the same manner as in Examples 1 to 4 and Comparative Examples 1 to 4, a side face of a substantially quadrangular prism polyethylene test piece was polished to an intended surface roughness Ra. The test pieces in Examples 5 to 7 and Comparative Example 5 were polished with a polishing composition slurry and a polishing pad and then subjected to lubricant coating, scraping, and brushing. The test piece in Comparative Example 6 was subjected to rough polishing with a sandpaper (WA #320) and then subjected to lubricant coating, scraping, and brushing.

The polishing composition slurry used for polishing the test piece in Example 5 contained 20% by mass of silica having an average secondary particle diameter of 80 nm and 80% by mass of pure water (pH=10). The polishing pad used for polishing the test piece in Example 5 was made from suede. The polishing composition slurry used for polishing the test piece in Example 6 contained 20% by mass of alumina having an average secondary particle diameter of 3.0 μm and 80% by mass of pure water (pH=6). The polishing pad used for polishing the test piece in Example 6 was made from nonwoven fabric. The polishing composition slurry used for polishing the test piece in Example 7 contained 20% by mass of alumina having an average secondary particle diameter of 12.0 μm and 80% by mass of pure water (pH=6). The polishing pad used for polishing the test piece in Example 7 was made from nonwoven fabric. The polishing composition slurry used for polishing the test piece in Comparative Example 5 contained 20% by mass of alumina having an average secondary particle diameter of 59.0 μm and 80% by mass of pure water (pH=6). The polishing pad used for polishing the test piece in Comparative Example 5 was made from nonwoven fabric. The polishing conditions for the test pieces in Examples 5 to 7 and Comparative Example 5 were the same as in Examples 1 to 4 and Comparative Examples 1 to 4.

To each polished face of the test pieces in Examples 5 to 7 and Comparative Examples 5 and 6, a lubricant was applied to form a lubricant coating. The lubricant used was waxes, EXTRA BASE WAX and HYBRID HF VIOLET manufactured by Gallium Co., Ltd. Specifically, EXTRA BASE WAX was applied with a hot iron, and then an excess wax was removed by scraping and brushing. Next, HYBRID HF VIOLET was applied thereto with a hot iron, and an excess wax was removed by scraping and brushing.

The surface roughnesses Ra of the polished faces after application of the lubricant (the surface roughnesses Ra of the lubricant coatings) are illustrated in Table 2. The measurement method of the surface roughnesses Ra of the test pieces was the same as in Examples 1 to 4 and Comparative Examples 1 to 4.

The sliding performance of each test piece in Examples 5 to 7 and Comparative Examples 5 and 6 prepared as above was evaluated at the time of sliding on snow. For each test piece, the polished face coated with the lubricant coating was the sliding surface to come into contact with the snow surface.

A test piece was placed on an inclined snow surface while the sliding surface faced downward, and the sliding performance of the test piece sliding downward along the snow surface was evaluated. The inclined snow surface was a slope having a height difference of 200 cm, a length of 30 m, and an inclination angle of 4°.

Sliding performance was evaluated in the following two conditions. In condition 3, the ambient temperature was −2.5° C., the humidity was 70%, the snow temperature was −4° C., and the snow quality was artificial snow. In condition 4, the ambient temperature was 0° C., the humidity was 61%, the snow temperature was −3° C., and the snow quality was fastened fresh snow.

In the condition 3 and the condition 4, sliding performance was evaluated by the following procedure. In other words, an infrared measurement apparatus with photoelectric tubes was used to measure the time for a test piece to slide on an inclined snow surface having a length of 30 m, and the sliding performance was evaluated on the basis of the sliding time.

TABLE 2

| | Surface roughness Ra | Time (seconds) | |
|---|---|---|---|
| | (μm) | Condition 3 | Condition 4 |
| Example 5 | 0.12 | 9.7 | 7.8 |
| Example 6 | 0.31 | 10.4 | 7.8 |
| Example 7 | 0.50 | 11.8 | 8.1 |
| Comp. Ex. 5 | 1.44 | — | 8.6 |
| Comp. Ex. 6 | 2.52 | 12.6 | 10.0 |

The results are listed in Table 2. As apparent from the results, Examples 5 to 7 in which the sliding surfaces had a surface roughness Ra of 1.0 μm or less had excellent sliding performance as compared with Comparative Example 5 in which the sliding surface had a surface roughness Ra of 1.44 μm and Comparative Example 6 in which the sliding surface had a surface roughness Ra of 2.52 μm.

REFERENCE SIGNS LIST

1 sliding surface
16 coating

The invention claimed is:
1. A sliding instrument to slide on snow, ice, or water, the sliding instrument comprising:
   a sliding surface to come into contact with a snow surface, an ice surface, or a water surface, the sliding surface having a surface roughness Ra of 0.12 μm or less.
2. The sliding instrument according to claim 1, wherein the sliding surface has a surface roughness Ra of 0.1 μm or less.
3. The sliding instrument according to claim 1, wherein the sliding surface is coated with a lubricant coating.
4. A method for manufacturing a sliding instrument to slide on snow, ice, or water, the method comprising:
   polishing a sliding surface to come into contact with a snow surface, an ice surface, or a water surface, with a polishing composition slurry containing abrasives to make the sliding surface have a surface roughness Ra of 0.12 μm or less.
5. The method for manufacturing a sliding instrument according to claim 4, wherein the polishing makes the sliding surface have a surface roughness Ra of 0.1 μm or less.
6. The method for manufacturing a sliding instrument according to claim 4, further comprising, after the polishing, applying a lubricant coating onto the polished sliding surface.
7. The sliding instrument according to claim 2, wherein the sliding surface is coated with a lubricant coating.
8. The method for manufacturing a sliding instrument according to claim 4, further comprising, after the polishing, applying a lubricant coating onto the polished sliding surface.
9. The method for manufacturing a sliding instrument according to claim 5, further comprising, after the polishing, applying a lubricant coating onto the polished sliding surface.
10. The sliding instrument according to claim 1, wherein the sliding surface has a surface roughness Ra of 0.12 μm or less and wherein the sliding instrument comprises a resin.

11. The method for manufacturing a sliding instrument according to claim 4, wherein the polishing makes the sliding surface have a surface roughness Ra of 0.12 µm or less and wherein the sliding instrument comprises a resin.

12. The sliding instrument of claim 1, wherein the sliding surface comprises a resin material.

13. The sliding instrument of claim 12, wherein the resin material is selected from the group consisting of polyethylene, polypropylene, polybutene, polyacetal, polymethacrylate, polytetrafluoroethylene, and combinations thereof.

* * * * *